May 6, 1952        W. T. GRAHAM        2,595,353
FILLER PAD FOR GROUND WORKING TOOLS
Filed Nov. 12, 1948
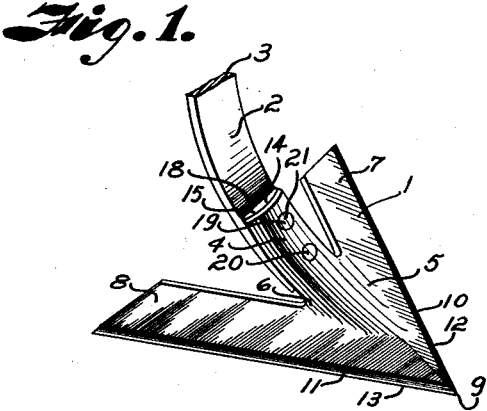
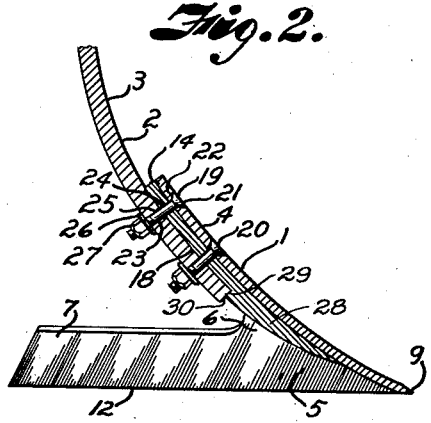
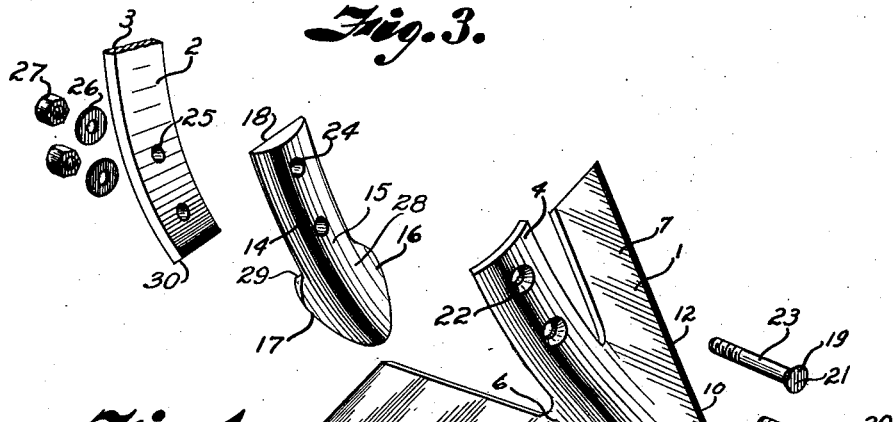
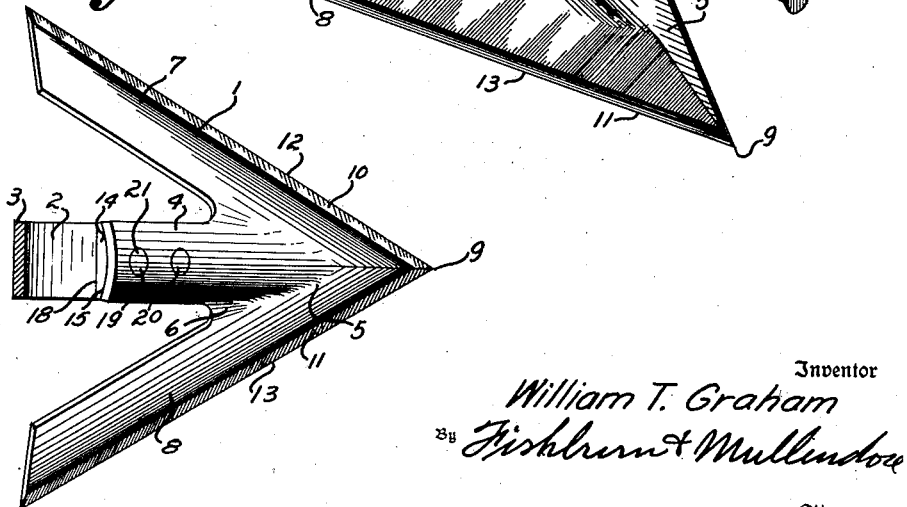
Inventor
William T. Graham
By Fishburn & Mullendore
Attorneys Patented May 6, 1952

2,595,353

UNITED STATES PATENT OFFICE 2,595,353

FILLER PAD FOR GROUND WORKING TOOLS

William T. Graham, Amarillo, Tex.

Application November 12, 1948, Serial No. 59,696

2 Claims. (Cl. 97—204)

This invention relates to ground working tools for plows of the type disclosed in the Noell et al. Patent No. 2,029,249, January 28, 1936.

Plows of this character employ a plurality of laterally arranged ground conditioning tools that work under the surface to heave and break the soil and form alternate ridges and furrows having exposed surfaces composed of clods, straw and other mulching material occurring on a field. The ground prepared by plows of this character is in satisfactory condition to conserve moisture and retard soil erosion, but since the original surface of the ground between the furrows is left undisturbed, the weeds are merely covered by loose material displaced from the furrows with the result that they continue to grow. Another difficulty with such plows is that loose materials on the top of the ridges tend to conduct moisture from the furrows through capillaries in the ridges.

These difficulties have been overcome by providing the ground working tools with sweeps that cut through the soil of the ridges to sever the weeds and close the capillaries. Usually such sweeps are in the form of attachments to the conventional ground working tools or chisels, because it has been difficult to provide a satisfactory one-piece structure and effect rigid attachment thereof to the resilient shanks of the plow.

Therefore, the principal objects of the present invention are to provide a one-piece sweep having a shape which gives the required strength and to provide a filler pad for accommodating the sweep to the attaching surface of the plow shanks whereby the sweeps are additionally reinforced and adapted to be rigidly and securely anchored in ground working position.

A further object of the invention is to provide the filler pad with wings for backing the wings of the sweep.

In accomplishing these and other objects of the invention, I have provided improved structure, the preferred form of which is illustrated in the accompanying drawing wherein:

Fig. 1 is a perspective view of a sweep constructed in accordance with the present invention and illustrating the attachment thereof to the resilient shank of a plow.

Fig. 2 is a longitudinal central section through the sweep and plow shank, particularly illustrating the filler pad and attachment of the sweep.

Fig. 3 is a perspective view of the parts shown in disassembled spaced relation to better illustrate the construction thereof.

Fig. 4 is a plan view of the sweep attached to the plow shank.

Referring more in detail to the drawings:

I designates a sweep constructed in accordance with the present invention and which is especially adapted for attachment to the relatively flat front face 2 of a forwardly curving shank 3 of a plow (not shown) of the type disclosed in the above mentioned patent. The sweep I is preferably formed of sheet metal cut and pressed into shape for providing shank and body portions 4 and 5 which are curved transversely as indicated at 6 to form laterally extending wing portions 7 and 8 diverging from a point 9 to provide angularly positioned blade portions 10 and 11 having cutting edges 12 and 13 along the front edges thereof.

In order to further stiffen the shank 4 and body portion 5 and provide rigidity of attachment to the plow shank, I provide a filler pad 14 having a front face 15 rounding transversely in accordance with the convex curvature of the shank portion 4 and which curves downwardly and forwardly in conformity with the longitudinal curvature of the mid portion of the sweep. The diverging or blade portions of the sweep are also supported by wing-like extensions 16 and 17 that extend laterally from the sides of the pad and which conform in contour to the corresponding under portions of the sweep.

The rear face 18 of the filler pad is shaped to conform with the face 2 of the plow shank so that it seats firmly thereagainst when the sweep is attached by fastening devices such as bolts 19 and 20. The bolts have flat heads 21 adapted to engage in tapered countersunk openings 22 that are provided in the shank portion 4 of the sweep as best shown in Figs. 2 and 3. The shank portions 23 of the bolts extend through registering apertures 24 in the filler pad and 25 in the plow shank and have threaded ends projecting beyond the rear face of the plow shank to accommodate washers 26 and nuts 27 by which the parts are drawn rigidly together with the filler pad clamped between the shank portion of the sweep and the plow shank 3. As shown in the drawing, the portion 28 of the filler pad that extends beyond the terminal of the plow shank 3 is relatively thicker at the terminal point of the plow shank to form a shoulder 29 that abuts against the end face 30 of the plow shank as illustrated in Fig. 2 for relieving shear stresses on the bolts 19 and 20.

With the sweep constructed and mounted as described, the point of the sweep enters the ground below the surface thereof and the diverging blades cut through stems of the vegetation near the roots to leave the vegetation and other debris on the ridges for forming a mulch to assist in retention of the moisture in the soil.

The filler pad fills in the space between the mid portion of the sweep and permits a firm seat thereof upon the resilient shank of the plow. The pad and lateral projections thereon also back the sweeps against thrusts tending to distort them when the plow is in operation.

From the foregoing it is obvious that I have provided one-piece sweeps that are strong in construction and which are adapted to be rigidly secured to the resilient shanks of a plow.

What I claim and desire to secure by Letters Patent is:

1. A filler pad adapted for insertion between a downwardly and forwardly curving plow shank and a sweep having a similar and transversely curving shank portion projecting from a similarly curving and forwardly pointed body portion having laterally diverging wings, said filler pad having a front face portion conforming to said curvatures of said shank and body portions of the sweep and having wing-like supporting portions projecting laterally from the body portion of the filler plate and having faces conforming to the junctures of the body portion of the sweep and said diverging wings, said shank portion of the pad having a rear face conforming to the shape of the plow shank, and bolts adapted to extend through openings in said shank portions of the sweep and filler pad and through the plow shank for retaining the filler pad in supporting contact with the underside of the sweep and for attaching the sweep and filler pad to the plow shank.

2. A filler pad adapted for insertion between a downwardly and forwardly curving plow shank and a sweep having a similar and transversely curving shank portion projecting from a similarly curving body portion having laterally diverging wings, said filler pad having a front face portion conforming to said curvatures of said shank and body portions of the sweep and having wing-like supporting portions projecting laterally from the body portion of the filler plate and having faces conforming to the junctures of the body portion of the sweep and said diverging wings, said shank portion of the pad having a rear face conforming to the shape of the plow shank, and bolts adapted to extend through openings in said shank portions of the sweep and filler pad and through the plow shank for retaining the filler pad in supporting contact with the underside of the sweep and for attaching the sweep and filler pad to the plow shank, said body portion of the filler pad having a shoulder to abut against the end of the plow shank to relieve shear forces on said bolts.

WILLIAM T. GRAHAM.

REFERENCES CITED

The following references are of record in the file of this patent:

UNITED STATES PATENTS

| Number | Name | Date |
|---|---|---|
| 153,646 | White | July 28, 1874 |
| 472,348 | Hatfield | Apr. 5, 1892 |
| 959,528 | Herscher | May 31, 1910 |
| 2,351,388 | Baxter | June 13, 1944 |